(12) United States Patent
Lee et al.

(10) Patent No.: US 11,370,265 B2
(45) Date of Patent: Jun. 28, 2022

(54) THERMAL MANAGEMENT SYSTEM FOR VEHICLE

(71) Applicants: Hyundai Motor Company, Seoul (KR); Kia Motors Corporation, Seoul (KR)

(72) Inventors: Sang Shin Lee, Suwon-Si (KR); Man Ju Oh, Yongin-Si (KR); So La Chung, Seoul (KR); Jae Woong Kim, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 214 days.

(21) Appl. No.: 16/833,224

(22) Filed: Mar. 27, 2020

(65) Prior Publication Data
US 2021/0061055 A1 Mar. 4, 2021

(30) Foreign Application Priority Data

Aug. 29, 2019 (KR) .......................... 10-2019-0106731

(51) Int. Cl.
*B60H 1/00* (2006.01)
*B60H 1/22* (2006.01)
*B60H 1/32* (2006.01)

(52) U.S. Cl.
CPC ..... *B60H 1/00278* (2013.01); *B60H 1/00007* (2013.01); *B60H 1/00392* (2013.01);
(Continued)

(58) Field of Classification Search
CPC .............. B60H 1/00278; B60H 1/3228; B60H 1/00007; B60H 1/00392; B60H 1/00485;
(Continued)

(56) References Cited

U.S. PATENT DOCUMENTS 11,180,000 B2 * 11/2021 Aikawa .............. B60H 1/00278
2007/0071178 A1 * 3/2007 Ozaki ..................... H04M 1/82
379/29.1
(Continued)

FOREIGN PATENT DOCUMENTS

KR 10-1637763 B1 7/2016

*Primary Examiner* — Marc E Norman
(74) *Attorney, Agent, or Firm* — Morgan, Lewis & Bockius LLP

(57) ABSTRACT

A thermal management system includes a refrigerant line including a compressor, a water-cooled condenser, and a cooling core for indoor air conditioning connected to the water-cooled condenser such that refrigerant emerging from the water-cooled condenser is introduced into the cooling core for indoor air conditioning, and a battery line including a high-voltage battery heat exchanging module and a heater core for indoor air conditioning. The battery line is connected to the refrigerant line through the water-cooled condenser in a heat exchangeable manner such that the high-voltage battery heat exchanging module and the heater core for indoor air conditioning are connected in parallel to the water-cooled condenser via a first valve to cause cooling water heated while passing through the water-cooled condenser to be selectively introduced into the high-voltage battery heat exchanging module or the heater core for indoor air conditioning.

15 Claims, 8 Drawing Sheets

(52) U.S. Cl.
CPC ..... *B60H 1/00485* (2013.01); *B60H 1/00735* (2013.01); *B60H 1/00885* (2013.01); *B60H 1/22* (2013.01); *B60H 1/3211* (2013.01); *B60H 1/3228* (2019.05); *B60H 2001/00307* (2013.01); *B60H 2001/3266* (2013.01)

(58) Field of Classification Search
CPC .. B60H 1/00735; B60H 1/00885; B60H 1/22; B60H 1/3211; B60H 2001/00307; B60H 2001/3266
See application file for complete search history.

(56) References Cited

U.S. PATENT DOCUMENTS

| | | | |
|---|---|---|---|
| 2018/0040910 A1* | 2/2018 | Chung | H01M 4/139 |
| 2020/0139786 A1* | 5/2020 | Nakamura | B60H 1/00921 |
| 2021/0031589 A1* | 2/2021 | Yamamoto | B60H 1/00428 |
| 2021/0245571 A1* | 8/2021 | Hwang | B60H 1/00278 |

* cited by examiner

THERMAL MANAGEMENT SYSTEM FOR VEHICLE

CROSS-REFERENCE TO RELATED APPLICATION

The present application claims priority to Korean Patent Application No. 10-2019-0106731, filed on Aug. 29, 2019, the entire contents of which is incorporated herein for all purposes by this reference.

BACKGROUND OF THE INVENTION

Field of the Invention

The present invention relates to a thermal management system for a vehicle capable of efficiently managing energy required for indoor air conditioning and cooling and heating of a battery in fields associated with thermal management of vehicles.

Description of Related Art

Eco-friendly vehicles (a hybrid vehicle, a plug-in hybrid vehicle, an electric vehicle, a fuel cell vehicle, etc.) include a motor, a recharger, an inverter, a power converter, a lithium ion battery, etc. In common. Such constituent elements are elements from which heat is generated, and accordingly, cooling water is used to remove heat generated from these elements. The lithium ion battery includes an internal material which is combustible, and accordingly, may catch fire or may explode when an abnormal situation such as overcharge or nail penetration occurs in the lithium ion battery.

To solve such a problem, a solid-state battery, in which a solid electrolyte is substituted for a polymer electrolyte, has been provided. Through substitution of the solid electrolyte for the polymer electrolyte, the solid-state battery may not only achieve chemical stability, but also solve problems such as solution leakage and firing.

The solid-state battery exhibits degraded output performance at low temperature because the electrolyte thereof exhibits low ion conductivity at low temperature while exhibiting high ion conductivity at high temperature. For the present reason, to achieve an enhancement in output performance, the solid-state battery may be maintained at high temperature at which high ion conductivity is exhibited.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a thermal management system for a vehicle configured for appropriately maintaining a temperature of a battery through an increase in the temperature of the battery together with indoor air conditioning or the like.

In accordance with an aspect of the present invention, the above and other objects may be accomplished by the provision of a thermal management system for a vehicle including a refrigerant line including a compressor, a water-cooled condenser, and a cooling core for indoor air conditioning connected to the water-cooled condenser such that refrigerant emerging from the water-cooled condenser is introduced into the cooling core for indoor air conditioning, and a battery line including a high-voltage battery heat exchanging module and a heater core for indoor air conditioning, the battery line being connected to the refrigerant line through the water-cooled condenser in a heat exchangeable manner such that the high-voltage battery heat exchanging module and the heater core for indoor air conditioning are connected in parallel to the water-cooled condenser via a first valve, to cause cooling water heated while passing through the water-cooled condenser to be selectively introduced into the high-voltage battery heat exchanging module or the heater core for indoor air conditioning.

The high-voltage battery connected to the high-voltage battery heat exchanging module in a heat exchangeable manner may be a solid-state battery.

The thermal management system may further include a water heater mounted at a point downstream of the water-cooled condenser, to heat cooling water in the battery line during operation of the water heater.

The thermal management system may further include a controller connected to the first valve and the compressor and configured for, in a first mode in which indoor cooling and battery heating are required, controlling the compressor and the first valve such that cooling water heated in the water-cooled condenser by refrigerant absorbing heat in the cooling core for indoor air conditioning is introduced into the high-voltage battery heat exchanging module.

The thermal management system may further include an electronic component line through which cooling water flows and in which a radiator and a chiller are connected in parallel to an electronic component core via a second valve such that cooling water emerging from the electronic component core is selectively introduced into the radiator or the chiller, and a refrigerant heating line having a branched portion disposed at a point upstream of the cooling core for indoor air conditioning such that the refrigerant heating line is joined to the refrigerant line while bypassing the cooling core for indoor air conditioning. The refrigerant heating line may include a third valve disposed at a point where the refrigerant heating line is branched from or joined to the refrigerant line. The refrigerant heating line may be connected to the electronic component line through the chiller in a heat exchangeable manner.

The thermal management system may further include a controller configured for, in a second mode in which electronic component cooling is required, controlling the second valve such that the cooling water emerging from the electronic component core is introduced into the radiator.

The thermal management system may further include a controller configured for, in a third mode in which electronic component cooling and battery heating are required, controlling the first valve such that cooling water emerging from the water-cooled condenser is introduced into the high-voltage battery heat exchanging module, controlling the second valve such that the cooling water emerging from the electronic component core is introduced into the chiller, and controlling the third valve such that the refrigerant emerging from the water-cooled condenser is introduced into the chiller.

The thermal management system may further include a refrigerant cooling line including an air-cooled condenser, the refrigerant cooling line being mounted between a point branched from the refrigerant line at a side downstream of the water-cooled condenser of the refrigerant line and a point again joined to the refrigerant line at the side downstream of the water-cooled condenser of the refrigerant line. The refrigerant cooling line may further include a fourth valve mounted at a point where the refrigerant cooling line is branched from or joined to the refrigerant line, the fourth valve configured for adjusting a flow rate ratio between the refrigerant line and the refrigerant cooling line.

The thermal management system may further include a controller connected to the fourth valve and configured for, in a fourth mode in which battery heating is performed through the air-cooled condenser and cooling of electronic components, controlling the first valve such that cooling water emerging from the water-cooled condenser is introduced into the high-voltage battery heat exchanging module, controlling the second valve such that the cooling water emerging from the electronic component core is introduced into the chiller, controlling the third valve such that the refrigerant emerging from the water-cooled condenser is introduced into the chiller, and controlling the fourth valve such that the refrigerant emerging from the water-cooled condenser is introduced into the refrigerant cooling line.

The thermal management system may further include a controller configured for, in a fifth mode in which electronic component cooling, battery heating and indoor cooling are required, controlling the first valve such that the cooling water emerging from the water-cooled condenser is introduced into the high-voltage battery heat exchanging module, controlling the second valve such that the cooling water emerging from the electronic component core is introduced into the chiller, and controlling the third valve such that the refrigerant emerging from the water-cooled condenser is introduced into the cooling core for indoor air conditioning and the refrigerant heating line.

The thermal management system may further include a controller configured for, in the sixth mode in which electronic component cooling, battery heating and indoor heating are required, controlling the first valve such that the cooling water emerging from the water-cooled condenser is introduced into the high-voltage battery heat exchanging module and the heater core for indoor air conditioning, controlling the second valve such that the cooling water emerging from the electronic component core is introduced into the chiller, and controlling the third valve such that the refrigerant emerging from the water-cooled condenser is introduced into the refrigerant heating line.

The thermal management system may further include a controller configured for, in the seventh mode in which electronic component cooling, battery heating and indoor dehumidification are required, controlling the first valve such that the cooling water emerging from the water-cooled condenser is introduced into the high-voltage battery heat exchanging module and the heater core for indoor air conditioning, controlling the second valve such that the cooling water emerging from the electronic component core is introduced into the chiller, and controlling the third valve such that the refrigerant emerging from the water-cooled condenser is introduced into the cooling core for indoor air conditioning and the refrigerant heating line.

The thermal management system may further include an air conditioning apparatus including a heater core for indoor air conditioning, and configured to force air circulating an interior of the vehicle or air introduced from an outside of the vehicle to flow through the interior of the vehicle. The air conditioning apparatus may further include an air heater for heating a flow of air during operation thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
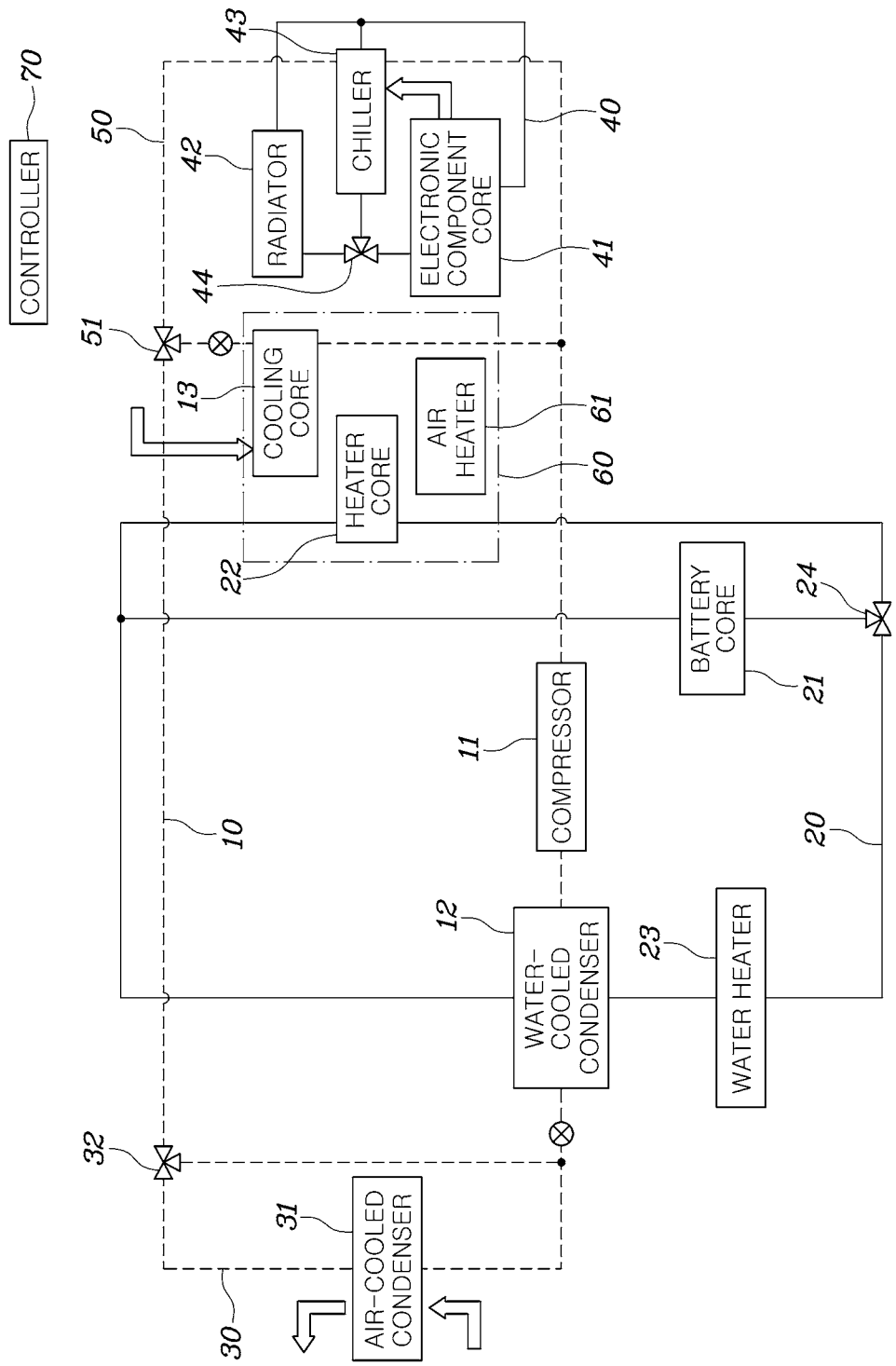
FIG. 1 is a block diagram of a thermal management system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

For embodiments of the present invention included herein, specific structural or functional descriptions are exemplary to merely describe the exemplary embodiments of the present invention, and the exemplary embodiments of the present invention may be implemented in various forms and may not be interpreted as being limited to the exemplary embodiments described in the exemplary embodiment of the present invention.

As various modifications may be made and multiple embodiments are applicable to the exemplary embodiments according to the concept of the present invention, specific embodiments will be illustrated with reference to the accompanying drawings and described in detail herein. However, these specific embodiments may not be construed as limiting the exemplary embodiments according to the concept of the present invention, but may be construed as extending to all modifications, equivalents, and substitutes included in the concept and technological scope of the present invention.

Terms including ordinal numbers such as first and/or second, etc. may be used to describe various elements, but the elements may not be limited by these terms. The terms are used merely for distinguishing one element from another element. For example, a first element may be renamed second element, and similarly, a second element may be renamed first element without departing from the scope of right of the present invention.

In the case where an element is "connected" or "linked" to another element, it may be understood that the element may be directly connected or linked to the other element, or another element may be present therebetween. On the other hand, in the case where an element is "directly connected" or "directly linked" to another element, it may be understood that no other element is present therebetween. Other expressions describing a relation between constituent elements, such as "between ~" and "immediately between ~", or "adjacent to ~" and "directly adjacent to ~", and the like, may be construed in a similar manner.

It may be noted that terms used herein are merely used to describe a specific embodiment, not to limit the present invention. Incidentally, unless clearly used otherwise, singular expressions include a plural meaning. In this application, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

Unless defined otherwise, terms used herein including technological or scientific terms have the same meaning as generally understood by those of ordinary skill in the art to which the present invention pertains. The terms used herein shall be interpreted not only based on the definition of any dictionary but also the meaning which is used in the field to which the present invention pertains. Furthermore, unless clearly defined, the terms used herein shall not be interpreted too ideally or formally.

Hereinafter, exemplary embodiments of the present invention will be described in detail with reference to the accompanying drawings, and the same reference numerals in the drawings designate the same elements, respectively.

FIG. 1 is a block diagram of a thermal management system for a vehicle according to an exemplary embodiment of the present invention.

Referring to FIG. 1, the thermal management system according to the exemplary embodiment of the present invention includes a refrigerant line 10, which includes a compressor 11, a water-cooled condenser 12, and a cooling core 13 for indoor air conditioning connected to the water-cooled condenser 12 such that refrigerant emerging from the water-cooled condenser 12 is introduced into the cooling core 13 for indoor air conditioning. The thermal management system also includes a battery line 20, which includes a high-voltage battery heat exchanging module 21 and a heater core 22 for indoor air conditioning, and is connected to the refrigerant line 10 through the water-cooled condenser 12 in a heat exchangeable manner such that the high-voltage battery heat exchanging module 21 and the heater core 22 for indoor air conditioning are connected in parallel to the water-cooled condenser 12 via a first valve 24 to cause cooling water heated while passing through the water-cooled condenser 12 to be selectively introduced into the high-voltage battery heat exchanging module 21 or the heater core 22 for indoor air conditioning.

Refrigerant may flow through the refrigerant line 10. The refrigerant may absorb ambient heat while being vaporized from a liquid state in the cooling core 13 for indoor air conditioning. An expansion valve is mounted at an upstream end portion of the cooling core 13, to vaporize liquefied refrigerant. The vaporized refrigerant may be compressed into a high-temperature and high-pressure state while passing through the compressor 11, and may then be condensed while being cooled through the water-cooled condenser 12 or an air-cooled condenser 31 which will be described later.

Cooling water flows through the battery line 20. In the water-cooled condenser 12, the cooling water may exchange heat with refrigerant in the refrigerant line 10. A pump is provided at the battery line 20, to circulate the cooling water in the battery line 20.

The cooling water emerging from the water-cooled condenser 12 in the battery line 20 may exchange heat with a high-voltage battery while being introduced into the high-voltage battery heat exchanging module via the first valve 24, heating the high-voltage battery. Alternatively, the cooling water emerging from the water-cooled condenser 12 in the battery line 20 may be introduced into the heater core 22 for indoor air conditioning via the first valve 24, heating air for indoor air conditioning of the vehicle. That is, the first valve 24 may control flow of the cooling water such that the cooling water emerging from the water-cooled condenser 12 is introduced into the high-voltage battery heat exchanging module 21 or the heater core 22 for indoor air conditioning.

That is, in accordance with various aspects of the present invention, a heat pump function may be performed by heating the high-voltage battery using heat recovered from the cooling core 13 for indoor air conditioning, and accordingly, there is an effect of enhancing thermal management energy efficiency of the vehicle.

In the instant case, the high-voltage battery may have an operation temperature range different from those of general lithium ion batteries. The high-voltage battery of the present invention may operate in a temperature range higher than those of general lithium ion batteries. Accordingly, the high-voltage battery of the present invention may not require separate cooling.

In an exemplary embodiment of the present invention, the high-voltage battery, which is connected to the high-voltage battery heat exchanging module 21 in a heat exchangeable manner, may be a solid-state battery. The temperature range in which the solid-state battery operates may be 60 to 100° C.

Accordingly, the high-voltage battery in the exemplary embodiment of the present invention may be heated through heat exchange thereof with the high-voltage battery heat exchanging module 21 mounted adjacent thereto, and cooling of the high-voltage battery using the high-voltage battery heat exchanging module 21 may not be required.

Furthermore, the thermal management system according to the exemplary embodiment of the present invention may further include a water heater 23 mounted at a point downstream of the water-cooled condenser 12, to heat cooling water in the battery line 20 during operation thereof.

The water heater 23 may be a heater for heating cooling water flowing into the battery line 20 using electrical energy, etc. A controller 70, which will be described later, may operate the water heater 23 to heat cooling water in the battery line 20 when heat required to heat the high-voltage battery is greater than heat absorbed by the water-cooled condenser 12.

The thermal management system according to the exemplary embodiment of the present invention may further include an electronic component line 40, in which a radiator 42 and a chiller 43 are connected in parallel to an electronic component core 41 via a second valve 44 such that cooling water emerging from the electronic component core 41 is selectively introduced into the radiator 42 or the chiller 43, and a refrigerant heating line 50 having a branched portion disposed at a point upstream of the cooling core 13 for indoor air conditioning such that the refrigerant heating line 50 is joined to the refrigerant line 10 while bypassing the cooling core 13 for indoor air conditioning. The refrigerant heating line 50 includes a third valve 51 mounted at a point where the refrigerant heating line 50 is branched from or joined to the refrigerant line 10. The refrigerant heating line 50 is connected to the electronic component line 40 through the chiller 43 in a heat exchangeable manner.

Cooling water flows through the electronic component line 40, and accordingly, is introduced into the electronic component core 41. Accordingly, the cooling water may cool electronic components which exchange heat with the electronic component core 41.

In the vehicle, electronic components such as an electronic control unit (ECU), an on-board charger (OBC), and a motor may be provided. Such electronic components may generate heat while driving of the vehicle. Accordingly, the electronic component core 41 may be a concept including both a heat dissipation unit directly connected to the electronic components, etc and a heat dissipation unit indirectly connected to the electronic components, etc. Through a separate cooling water line.

The radiator 42, which is exposed to ambient air, to exchange heat with ambient air, may be included in the electronic component line 40. Accordingly, heat may be introduced into the radiator 42 after being recovered. Furthermore, the chiller 43, which is connected to refrigerant in a heat exchangeable manner, may be included in the electronic component line 40. Cooling water heated by the electronic components may be cooled through heat exchange thereof with refrigerant in the chiller 43.

The radiator 42 and the chiller 43 are connected to the electronic component core 41 via the second valve 44. Accordingly, flow of cooling water may be controlled by the second valve 44 such that cooling water emerging from the electronic component core 41 is selectively introduced into the radiator 42 or the chiller 43. A pump is also provided at the electronic component line 40, to circulate cooling water in the electronic component line 40.

Refrigerant in the refrigerant line 10 may be selectively introduced into the refrigerant heating line 50 under control of the third valve 51. That is, the third valve 51 may control flow of the refrigerant in the refrigerant line 10 such that the refrigerant flows through the cooling core 13 for indoor air conditioning flows through the chiller 42 after bypassing the cooling core 13 for indoor air conditioning.

The thermal management system according to the exemplary embodiment of the present invention may further include a refrigerant cooling line 30 which includes an air-cooled condenser 31, and is mounted between a point branched from the refrigerant line 10 at a side downstream of the water-cooled condenser 12 of the refrigerant line 10 and a point again joined to the refrigerant line 10 at the side downstream of the water-cooled condenser 12 of the refrigerant line 10. A fourth valve 32 is also included in the refrigerant cooling line 30. The fourth valve 32 is mounted at a point where the refrigerant cooling line 30 is branched from or joined to the refrigerant line 10. The fourth valve 32 may adjust a flow rate ratio between the refrigerant line 10 and the refrigerant cooling line 30.

The air-cooled condenser 31, which is exposed to ambient air, to exchange heat with ambient air, may be included in the refrigerant cooling line 30. The fourth valve 32 may control flow of refrigerant emerging from the water-cooled condenser 12 such that the refrigerant flows through the air-cooled condenser 31 after being introduced into the refrigerant cooling line 30 or bypasses the air-cooled condenser 31.

The refrigerant cooling line 30, the air-cooled condenser 31, and the fourth valve 32 may be omitted to reduce manufacturing costs. However, when additional cooling of refrigerant is required, these elements may be additionally provided.

The thermal management system according to the exemplary embodiment of the present invention may further include an air conditioning apparatus 60 which includes the heater core 22 for indoor air conditioning, and functions to force air circulating through the interior of the vehicle or air introduced from the outside of the vehicle to flow through the interior of the vehicle. The air conditioning apparatus 60 may further include an air heater 61 for heating a flow of air during operation thereof.

That is, air circulating through the interior of the vehicle or air introduced from the outside of the vehicle may flow through the air conditioning apparatus 60. The heater core 22 for indoor air conditioning and the cooling core 13 for indoor air conditioning may be mounted at the air conditioning apparatus 60.

The air heater 61, which is additionally included in the air conditioning apparatus 60, may receive electrical energy, etc. from the outside, heating air flowing into the air conditioning apparatus 60. The controller 70 may operate the air heater 61 when heat required for indoor air conditioning is greater than heat discharged from the heater core 22. The air heater 61 may be a low-voltage positive temperature coefficient (PTC) heater.

FIG. 2, FIG. 3, FIG. 4, FIG. 5, FIG. 6, FIG. 7, and FIG. 8 illustrate various control modes of the thermal management system according to an exemplary embodiment of the present invention.

Figure 2:
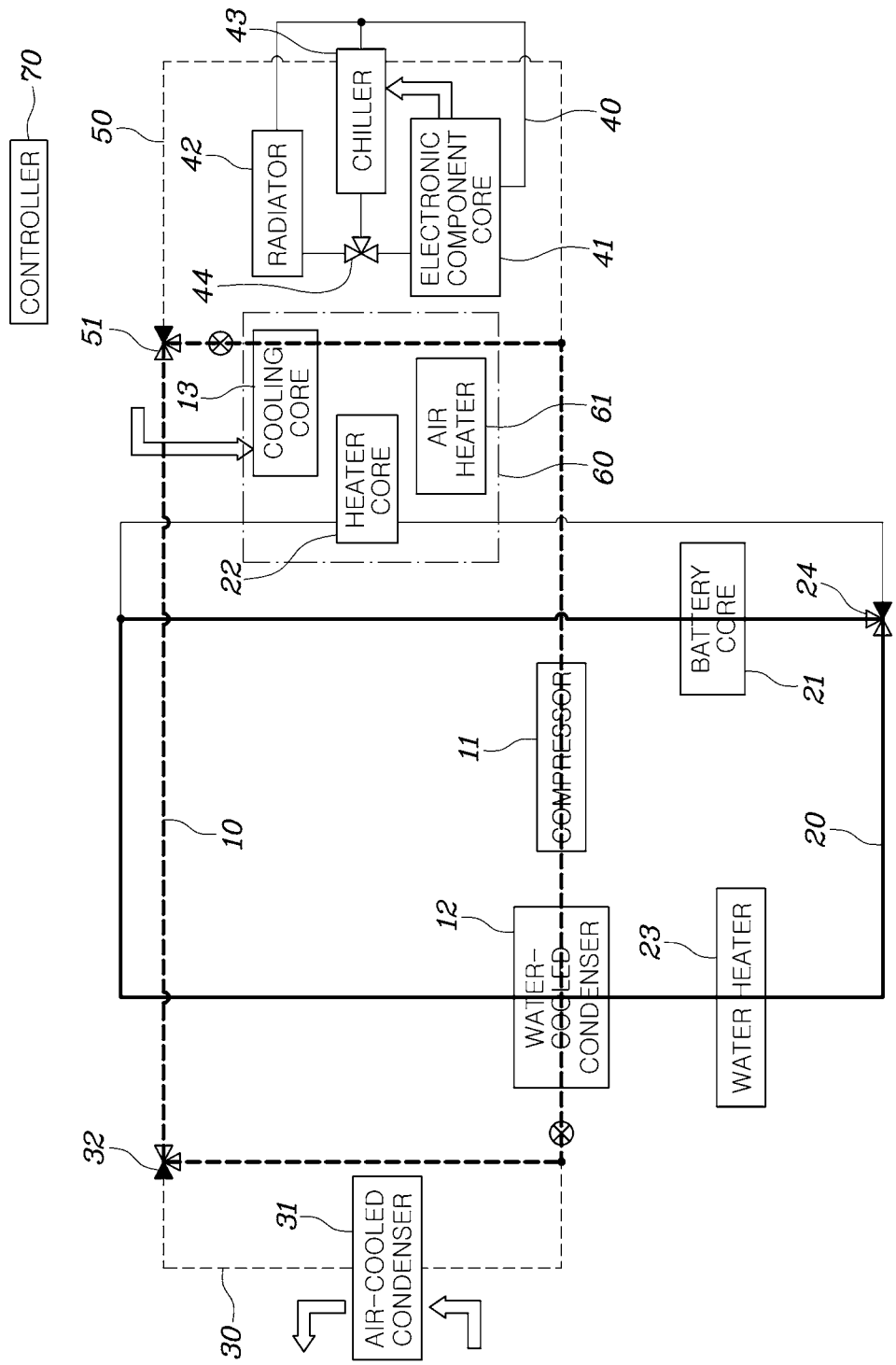
FIG. 2 illustrates a first mode of the thermal management system according to the exemplary embodiment of the present invention in which indoor cooling and battery heating are required.
Figure 3:
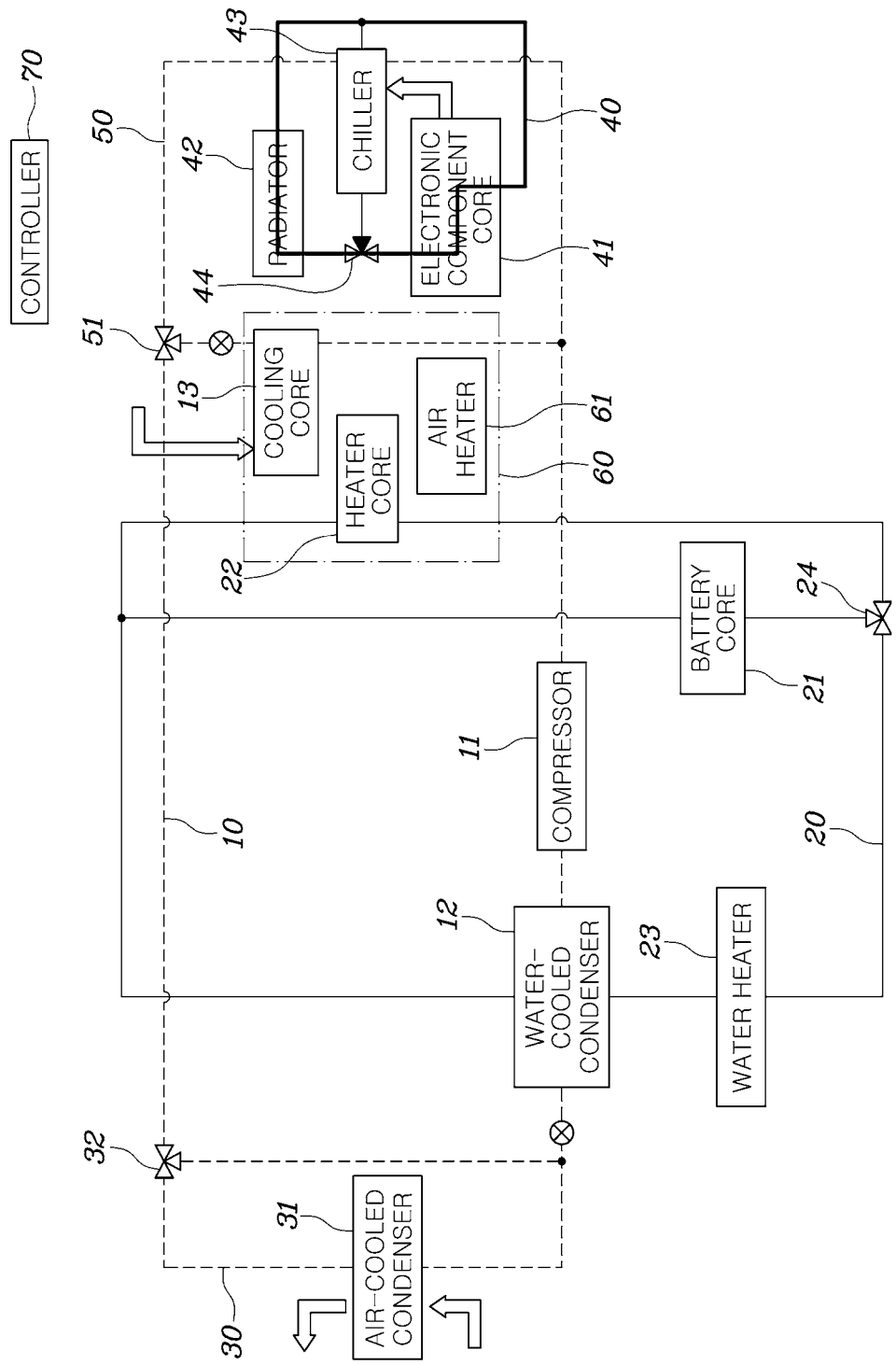
FIG. 3 illustrates a second mode of the thermal management system according to the exemplary embodiment of the present invention in which electronic component cooling is required.
Figure 4:
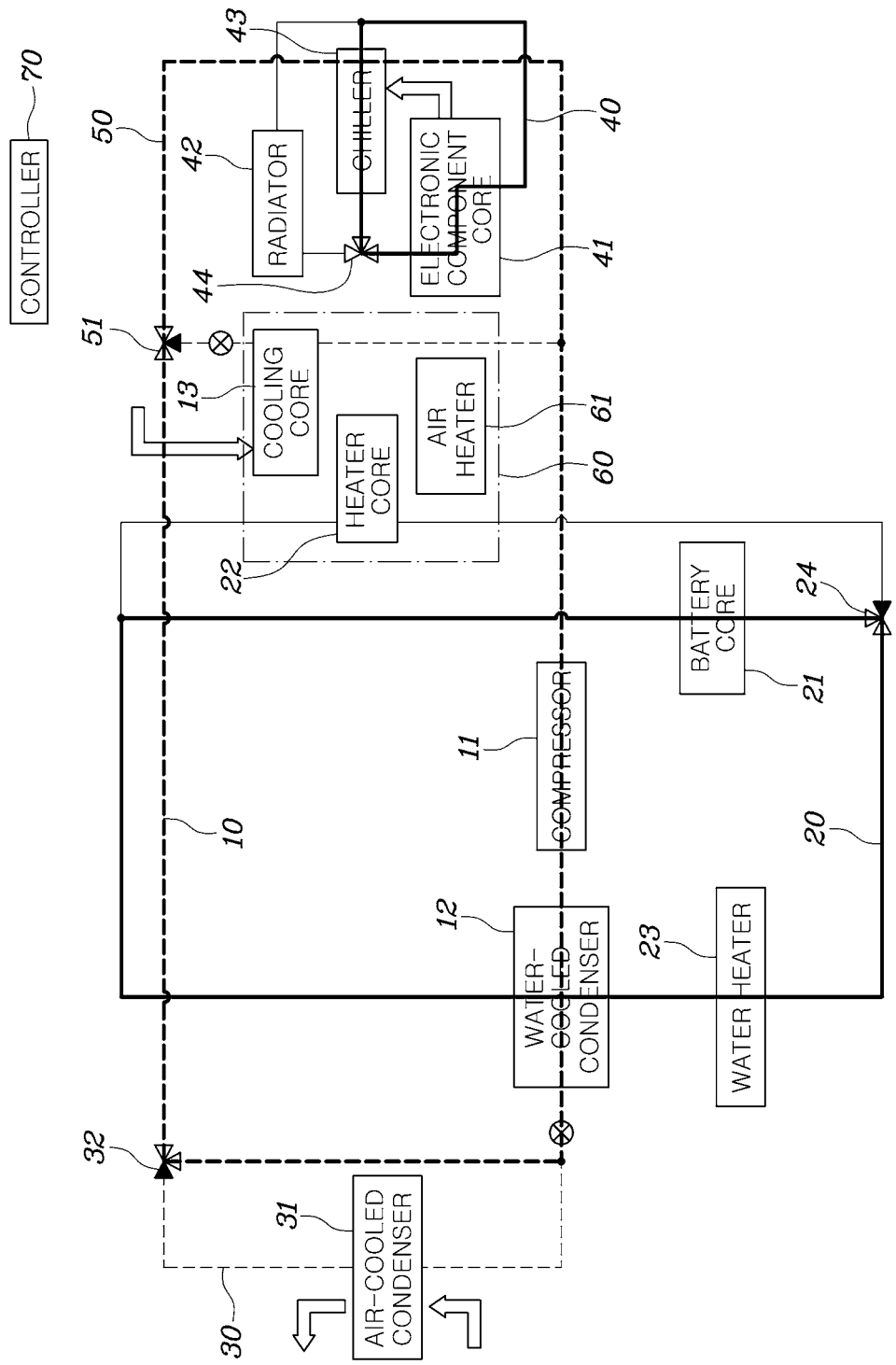
FIG. 4 illustrates a third mode of the thermal management system according to the exemplary embodiment of the present invention in which electronic component cooling and battery heating are required.
Figure 5:
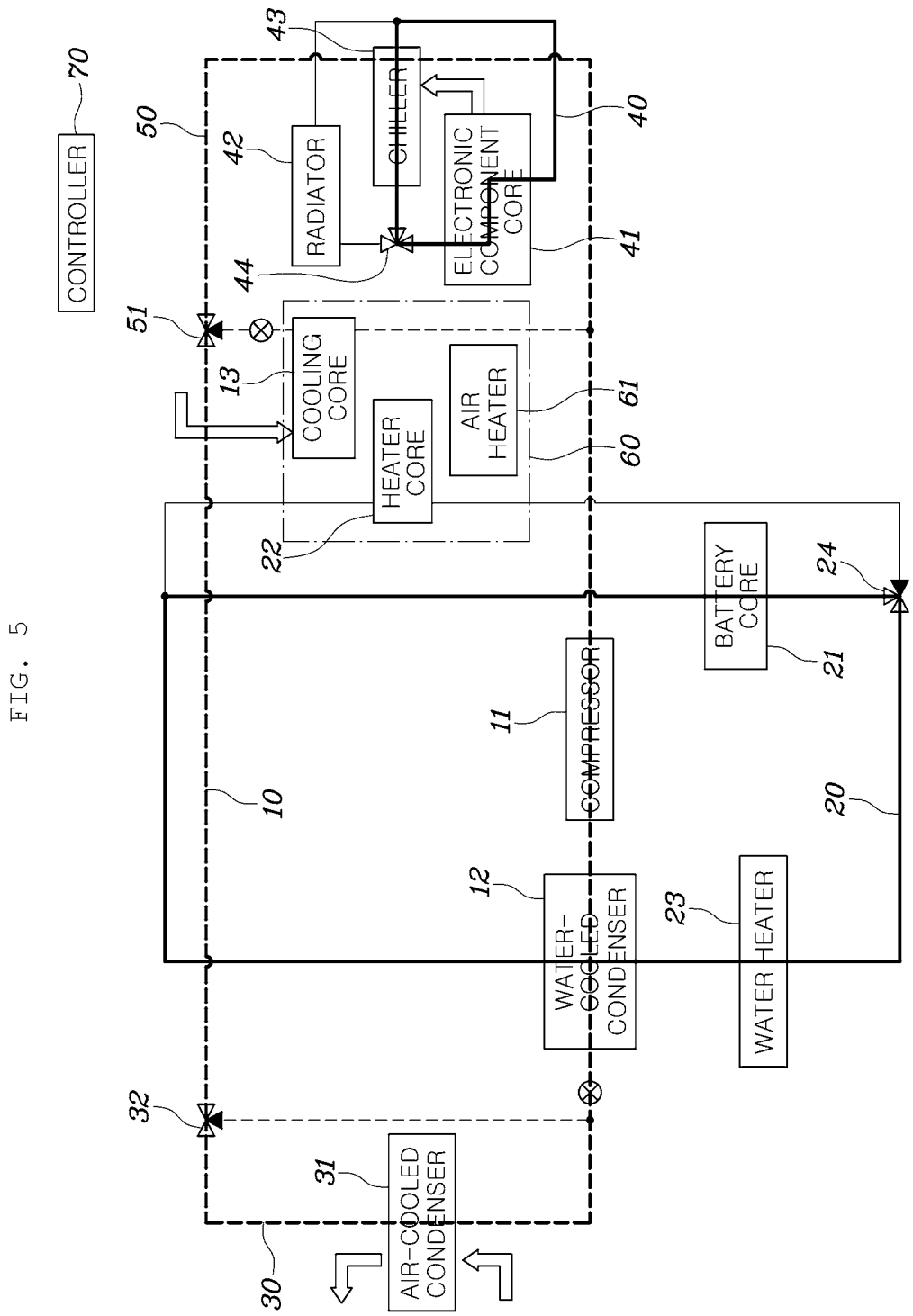
FIG. 5 illustrates a fourth mode of the thermal management system according to the exemplary embodiment of the present invention in which battery heating is performed through cooling of the air-cooled condenser and cooling of the electronic components.
Figure 6:
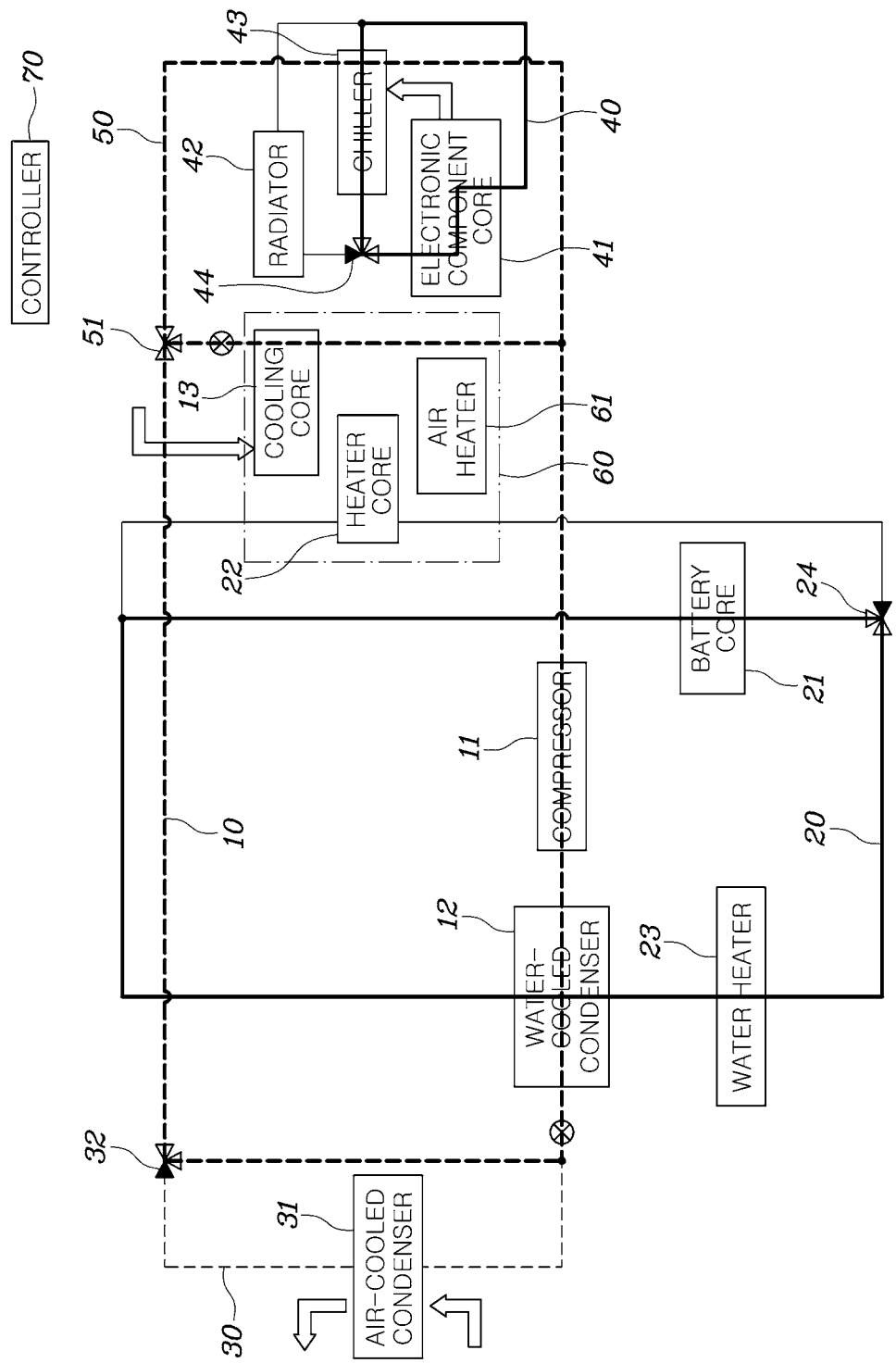
FIG. 6 illustrates a fifth mode of the thermal management system according to the exemplary embodiment of the present invention in which electronic component cooling, battery heating and indoor cooling are required.
Figure 7:
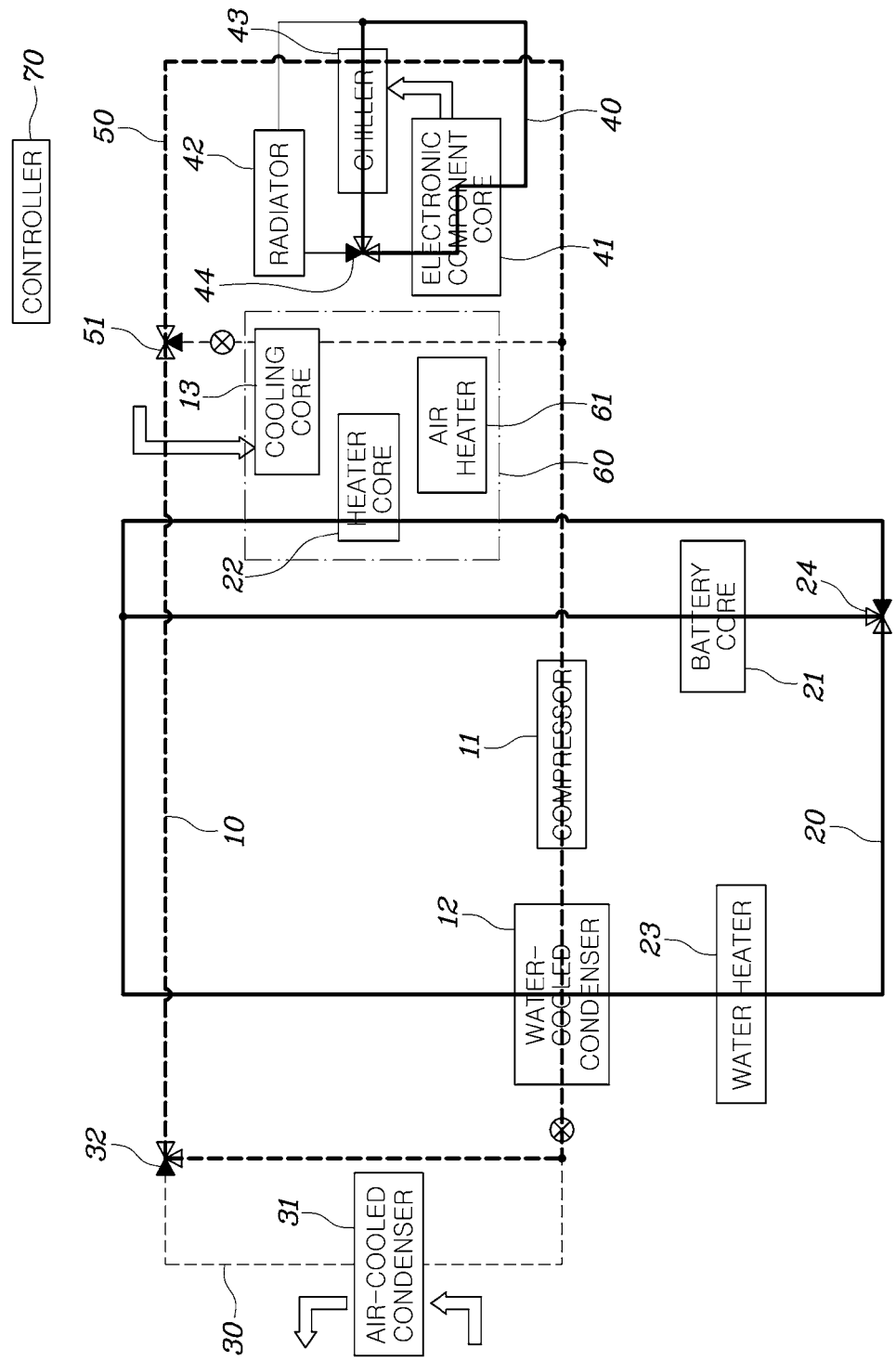
FIG. 7 illustrates a sixth mode of the thermal management system according to the exemplary embodiment of the present invention in which electronic cooling, battery heating and indoor heating are required.
Figure 8:
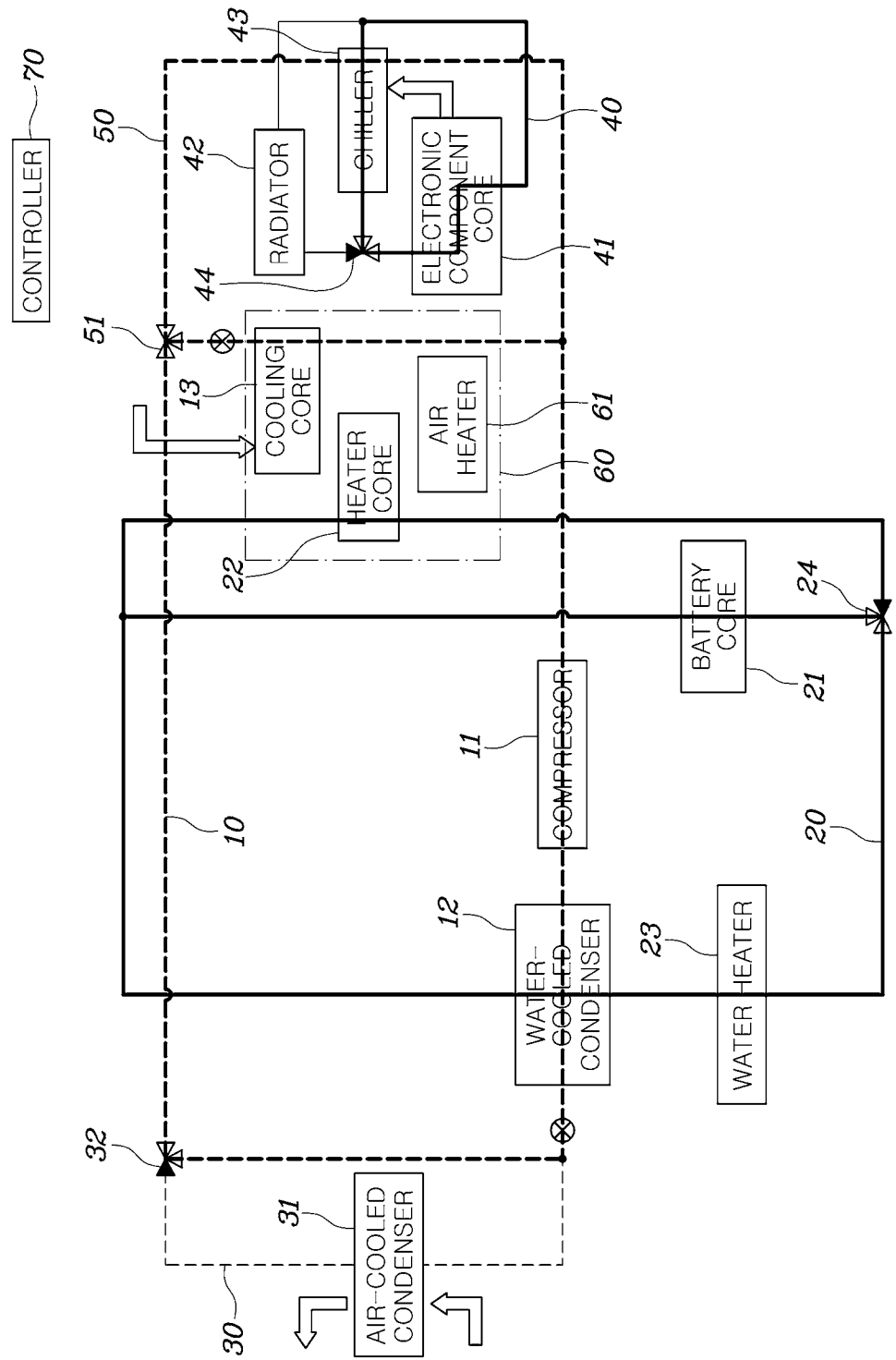
FIG. 8 illustrates a seventh mode of the thermal management system according to the exemplary embodiment of the present invention in which electronic cooling, battery heating and indoor dehumidification are required.

In detail, FIG. 2 illustrates a first mode of the thermal management system according to the exemplary embodiment of the present invention in which indoor cooling and battery heating are required. FIG. 3 illustrates a second mode of the thermal management system according to the exemplary embodiment of the present invention in which electronic component cooling is required. FIG. 4 illustrates a third mode of the thermal management system according to the exemplary embodiment of the present invention in which electronic component cooling and battery heating are required. FIG. 5 illustrates a fourth mode of the thermal management system according to the exemplary embodiment of the present invention in which battery heating is performed through cooling of the air-cooled condenser and cooling of the electronic components. FIG. 6 illustrates a fifth mode of the thermal management system according to the exemplary embodiment of the present invention in which electronic component cooling, battery heating and indoor cooling are required. FIG. 7 illustrates a sixth mode of the thermal management system according to the exemplary embodiment of the present invention in which electronic cooling, battery heating and indoor heating are required. FIG. 8 illustrates a seventh mode of the thermal management system according to the exemplary embodiment of the present invention in which electronic cooling, battery heating and indoor dehumidification are required.

In accordance with various exemplary embodiments of the present invention, the controller 70 may be embodied through a non-volatile memory configured to store an algorithm configured to control operation of various constituent elements of the vehicle or data as to software commands for execution of the algorithm, and a processor configured to execute operation as will be described hereinafter, using the data stored in the memory. Here, the memory and the processor may be embodied as individual chips, respectively. Alternatively, the memory and the processor may be embodied as a single unified chip. The processor may take the form of one or more processors.

In the first mode in which indoor cooling and battery heating are required, the controller may be configured to control the compressor 11 and the first valve 24 such that cooling water heated in the water-cooled condenser 12 by refrigerant absorbing heat in the cooling core 13 for indoor air conditioning is introduced into the high-voltage battery heat exchanging module 21.

The first mode may be a state in which temperature of ambient air is relatively high, and accordingly, relatively great indoor cooling and relatively small battery heating are required.

In detail, in the first mode, the controller 70 may control the first valve 24 such that cooling water emerging from the water-cooled condenser 12 is introduced into the high-voltage battery heat exchanging module 21. Furthermore, the controller 70 may control the third valve 51 such that refrigerant in the refrigerant line 10 is introduced into the cooling core 13 for indoor air conditioning.

Accordingly, in the first mode, there may be an effect configured for heating the high-voltage battery using heat absorbed through indoor cooling.

In the second mode in which electronic component cooling is required, the controller 70 may control the second valve 44 such that cooling water emerging from the electronic component core 41 is introduced into the radiator 42.

In the second mode, the electronic components may be cooled using the radiator 42. The controller 70 may control the second valve 44 such that cooling water emerging from the electronic component core 41 is introduced into the radiator.

The first mode and the second mode are independent from each other, and accordingly, the controller 70 may simultaneously control the first mode and the second mode.

In the third mode in which electronic component cooling and battery heating are required, the controller 70 may control the first valve 24 such that cooling water emerging from the water-cooled condenser 12 is introduced into the high-voltage battery heat exchanging module 21, may control the second valve 44 such that cooling water emerging from the electronic component core 41 is introduced into the chiller 43, and may control the third valve 51 such that refrigerant emerging from the water-cooled condenser 12 is introduced into the chiller 43.

The third mode may be a state in which temperature of ambient air is appropriate, and accordingly, neither indoor heating nor indoor cooling is required, appropriate-level heating of the high-voltage battery is required, and cooling of the electronic components is required.

In the third mode, the controller 70 may control the first valve 24 such that cooling water emerging from the water-cooled condenser 12 is introduced into the high-voltage battery heat exchanging module 21. Furthermore, the controller 70 may control the second valve 44 such that cooling water emerging from the electronic component core 41 is introduced into the chiller 43, and may control the third valve 51 such that refrigerant in the refrigerant line 10 is introduced into the chiller 43 of the refrigerant heating line 50.

Accordingly, in the third mode, there may be an effect configured for heating the high-voltage battery using heat recovered from the electronic components.

In the fourth mode in which battery heating is performed through the air-cooled condenser 31 and cooling of the electronic components, the controller 70 may control the first valve 24 such that cooling water emerging from the water-cooled condenser 12 is introduced into the high-voltage battery heat exchanging module 21, may control the second valve 44 such that cooling water emerging from the electronic component core 41 is introduced into the chiller 43, may control the third valve 51 such that refrigerant emerging from the water-cooled condenser 12 is introduced into the chiller 43, and may control the fourth valve 32 such that refrigerant emerging from the water-cooled condenser 12 is introduced into the refrigerant cooling line 30.

In the fourth mode, the controller 70 may control refrigerant emerging from the water-cooled condenser 12 to be introduced into the air-cooled condenser 31 of the refrigerant cooling line 30 by controlling the fourth valve 32 while performing the same control as that of the third mode.

That is, when additional heat dissipation of refrigerant in the refrigerant line 10 is required, the controller 70 may perform control to force the refrigerant to flow through the air-cooled condenser 31.

In the fifth mode in which electronic component cooling, battery heating and indoor cooling are required, the controller 70 may control the first valve 24 such that cooling water emerging from the water-cooled condenser 12 is introduced into the high-voltage battery heat exchanging module 21, may control the second valve 44 such that cooling water emerging from the electronic component core 41 is introduced into the chiller 43, and may control the third valve 51 such that refrigerant emerging from the water-cooled condenser 12 is introduced into the cooling core 13 for indoor air conditioning and the refrigerant heating line 50.

In the fifth mode, the controller 70 may control the third valve 51 such that refrigerant emerging from the water-cooled condenser 12 is introduced into the cooling core 13 for indoor air conditioning and the refrigerant heating line 50 in a simultaneous manner, while performing control as that of the third mode. That is, refrigerant passing through the third valve 51 may be introduced into the cooling core 13 for indoor air conditioning and the chiller 43 in a simultaneous manner.

Accordingly, there may be an effect configured for heating the high-voltage battery through recovery of heat absorbed for indoor air conditioning and heat from the electronic components, and accordingly, eliminating the air-cooled condenser 31.

In the sixth mode in which electronic component cooling, battery heating and indoor heating are required, the controller 70 may control the first valve 24 such that cooling water emerging from the water-cooled condenser 12 is introduced into the high-voltage battery heat exchanging module 21 and the heater core 22 for indoor air conditioning, may control the second valve 44 such that cooling water emerging from the electronic component core 41 is introduced into the chiller 43, and may control the third valve 51 such that refrigerant emerging from the water-cooled condenser 12 is introduced into the refrigerant heating line 50.

The sixth mode may be a state in which temperature of ambient air may be relatively low, as in winter. In the sixth mode, relatively great battery heating may be required, and indoor heating may be required.

In the sixth mode, the controller 70 may perform battery heating and indoor heating using heat of the electronic components recovered through the chiller 43. For the present operation, the controller 70 may control the first valve 24 such that cooling water emerging from the water-cooled condenser 12 is introduced into the high-voltage battery heat exchanging module 21 and the heater core 22 for indoor air conditioning in a simultaneous manner, may control the second valve 44 such that cooling water emerging from the electronic component core 41 is introduced into the chiller 43, and may control the third valve 51 such that refrigerant emerging from the water-cooled condenser 12 is introduced into the refrigerant heating line 50.

Furthermore, the controller 70 may further operate the air heater 61 of the air conditioning apparatus 61.

In the seventh mode in which electronic component cooling, battery heating and indoor dehumidification are required, the controller 70 may control the first valve 24 such that cooling water emerging from the water-cooled condenser 12 is introduced into the high-voltage battery heat exchanging module 21 and the heater core 22 for indoor air conditioning, may control the second valve 44 such that cooling water emerging from the electronic component core 41 is introduced into the chiller 43, and may control the third valve 51 such that refrigerant emerging from the water-cooled condenser 12 is introduced into the cooling core 13 for indoor air conditioning and the refrigerant heating line 50.

The seventh mode is similar to the sixth mode, but achieves indoor dehumidification by additionally performing indoor cooling using the cooling core 13 for indoor air conditioning.

The controller 70 may control the third valve 51 such that refrigerant emerging from the water-cooled condenser 12 is introduced into the cooling core 13 for indoor air conditioning and the refrigerant heating line 50 in a simultaneous manner.

As apparent from the above description, in accordance with the thermal management system of the present invention, there may be an effect of achieving an enhancement in thermal energy efficiency by heating the battery using heat recovered through indoor air conditioning.

Furthermore, there may be an effect of achieving an enhancement in thermal management efficiency by heating the battery through recovery of waste heat of the electronic components.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the system comprising:
    a refrigerant line including a compressor, a water-cooled condenser, and a cooling core for indoor air conditioning so that refrigerant emerging from the water-cooled condenser is introduced into the cooling core for the indoor air conditioning; and
    a battery line including a battery heat exchanging module and a heater core for the indoor air conditioning, the battery line being connected to the refrigerant line through the water-cooled condenser,
    wherein the battery heat exchanging module and the heater core for the indoor air conditioning are connected in parallel to the water-cooled condenser via a first valve to cause cooling water heated while passing through the water-cooled condenser to be selectively introduced into the battery heat exchanging module or the heater core for the indoor air conditioning via the first valve.

2. The thermal management system according to claim 1, wherein a battery connected to the battery heat exchanging module is a solid-state battery.

3. The thermal management system according to claim 1, further including:
    a water heater mounted at a point of the battery line downstream of the water-cooled condenser, to heat cooling water in the battery line during operation of the water heater.

4. The thermal management system according to claim 1, further including:
    a controller connected to the first valve and the compressor and configured for, in a mode in which indoor cooling and battery heating are required, controlling the compressor and the first valve so that cooling water heated in the water-cooled condenser by refrigerant absorbing heat in the cooling core for the indoor air conditioning is introduced into the battery heat exchanging module.

5. The thermal management system according to claim 1, further including:
    an electronic component line through which cooling water flows and in which a radiator and a chiller are connected in parallel to an electronic component core via a second valve so that cooling water emerging from the electronic component core is selectively introduced into the radiator or the chiller via the second valve; and
    a refrigerant heating line having a branched portion mounted at a point of the refrigerant line upstream of the cooling core for the indoor air conditioning so that the refrigerant heating line is configured to be fluidically-connected to the refrigerant line while bypassing the cooling core for the indoor air conditioning, the refrigerant heating line including a third valve mounted at the point of the refrigerant line where the refrigerant heating line is selectively connectable to the refrigerant line fluidically, the refrigerant heating line being connected to the electronic component line through the chiller.

6. The thermal management system according to claim 5, wherein first ends of the radiator and the electronic component core are connected to a first end of the chiller via the second valve and second ends of the radiator and the electronic component core are connected to a second end of the chiller.

7. The thermal management system according to claim 5, further including:
a controller connected to the second valve and configured for controlling the second valve in a mode in which electronic component cooling is required, so that the cooling water emerging from the electronic component core is introduced into the radiator.

8. The thermal management system according to claim 5, further including:
a controller connected to the first valve, the second valve and the third valve and configured for, in a mode in which electronic component cooling and battery heating are required, controlling the first valve so that cooling water emerging from the water-cooled condenser is introduced into the battery heat exchanging module, controlling the second valve so that the cooling water emerging from the electronic component core is introduced into the chiller, and controlling the third valve so that the refrigerant emerging from the water-cooled condenser is introduced into the chiller.

9. The thermal management system according to claim 5, further including:
a refrigerant cooling line including an air-cooled condenser, the refrigerant cooling line being connected to a first point of the refrigerant line at upstream of the water-cooled condenser of the refrigerant line and to a second point of the refrigerant line at downstream of the water-cooled condenser of the refrigerant line,
wherein the refrigerant cooling line further includes a fourth valve mounted at the first point where the refrigerant cooling line is selectively connectable to the refrigerant line fluidically, the fourth valve configured for adjusting a flow rate ratio between the refrigerant line and the refrigerant cooling line.

10. The thermal management system according to claim 9, further including:
a controller connected to connected to the first valve, the second valve, the third valve, and the fourth valve and configured for, in a mode in which battery heating is performed through the air-cooled condenser and cooling of electronic components, controlling the first valve so that cooling water emerging from the water-cooled condenser is introduced into the battery heat exchanging module, controlling the second valve so that the cooling water emerging from the electronic component core is introduced into the chiller, controlling the third valve so that the refrigerant emerging from the water-cooled condenser is introduced into the chiller, and controlling the fourth valve so that the refrigerant emerging from the water-cooled condenser is introduced into the refrigerant cooling line.

11. The thermal management system according to claim 5, further including:
a controller connected to connected to the first valve, the second valve, and the third valve, and configured for, in a mode in which electronic component cooling, battery heating and indoor cooling are required, controlling the first valve so that the cooling water emerging from the water-cooled condenser is introduced into the battery heat exchanging module, controlling the second valve so that the cooling water emerging from the electronic component core is introduced into the chiller, and controlling the third valve so that the refrigerant emerging from the water-cooled condenser is introduced into the cooling core for the indoor air conditioning and the refrigerant heating line.

12. The thermal management system according to claim 5, further including:
a controller connected to the first valve, the second valve and the third valve and configured for, in a mode in which electronic component cooling, battery heating and indoor heating are required, controlling the first valve so that the cooling water emerging from the water-cooled condenser is introduced into the battery heat exchanging module and the heater core for the indoor air conditioning, controlling the second valve so that the cooling water emerging from the electronic component core is introduced into the chiller, and controlling the third valve so that the refrigerant emerging from the water-cooled condenser is introduced into the refrigerant heating line.

13. The thermal management system according to claim 5, further including:
a controller connected to the first valve, the second valve and the third valve and configured for, in a mode in which electronic component cooling, battery heating and indoor dehumidification are required, controlling the first valve so that the cooling water emerging from the water-cooled condenser is introduced into the battery heat exchanging module and the heater core for the indoor air conditioning, controlling the second valve so that the cooling water emerging from the electronic component core is introduced into the chiller, and controlling the third valve so that the refrigerant emerging from the water-cooled condenser is introduced into the cooling core for the indoor air conditioning and the refrigerant heating line.

14. The thermal management system according to claim 1, further including:
an air conditioning apparatus including the heater core for the indoor air conditioning, and configured to force air circulating an interior of the vehicle or air introduced from an outside of the vehicle to flow through the interior of the vehicle.

15. The thermal management system according to claim 14, wherein the air conditioning apparatus further includes an air heater for heating an air during operation of the air heater.

* * * * *